United States Patent
Desbiens et al.

(10) Patent No.: US 7,401,090 B2
(45) Date of Patent: Jul. 15, 2008

(54) COMPUTER-BASED BUSINESS PLANNING PROCESSES

(75) Inventors: Marc A Desbiens, Ottawa (CA); James Wallace Sinclair, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1618 days.

(21) Appl. No.: 10/015,983

(22) Filed: Nov. 2, 2001

(65) Prior Publication Data

US 2003/0088447 A1    May 8, 2003

(51) Int. Cl.
*G06F 17/00* (2006.01)
*G06F 17/30* (2006.01)
*G06F 9/46* (2006.01)

(52) U.S. Cl. .......... 707/102; 707/101; 707/103 R; 707/104.1; 705/8; 705/10

(58) Field of Classification Search .......... 707/3, 707/101, 102, 103 R, 104.1; 705/4, 7, 8, 705/26, 10; 706/45
See application file for complete search history.

(56) References Cited

U.S. PATENT DOCUMENTS

| | | | |
|---|---|---|---|
| 5,233,513 A | | 8/1993 | Doyle |
| 5,806,042 A * | | 9/1998 | Kelly et al. .......... 705/4 |
| 6,684,203 B1 * | | 1/2004 | Waddington et al. .......... 707/3 |
| 6,937,993 B1 * | | 8/2005 | Gabbita et al. .......... 705/8 |
| 6,965,886 B2 * | | 11/2005 | Govrin et al. .......... 706/45 |
| 6,980,962 B1 * | | 12/2005 | Arganbright et al. .......... 705/26 |
| 2002/0042731 A1 * | | 4/2002 | King et al. .......... 705/10 |
| 2002/0107819 A1 * | | 8/2002 | Ouimet .......... 705/400 |
| 2003/0084053 A1 * | | 5/2003 | Govrin et al. .......... 707/100 |
| 2004/0143470 A1 * | | 7/2004 | Myrick et al. .......... 705/7 |

OTHER PUBLICATIONS

"An Introduction to Database Systems," by C.J. Date, 7th Edition, 2000, Chapter 21 Decision Support, pp. 694-729.
"Control," by KCI Computing, Inc. of Torrance, CA.
"e.Planning," by Adaytum of Bloomington, MN.

* cited by examiner

*Primary Examiner*—Thuy N. Pardo
(74) *Attorney, Agent, or Firm*—Shumaker & Sieffert, P.A.

(57) ABSTRACT

The invention allows several users to manipulate complex data interactively, but separately, and then have the results of their inputs merged. It is based on hierarchical planning which matches typical business environments. The planning process is distributed over the management hierarchy and each level may contribute one or more alternative plans for consideration by a superior level. The distribution of the process is carried out using computer-enabled 'delegation'. Relationships are specified between a dimensional structure and a responsibility structure such that sub-plans and plans using the dimensional structure of a planning data repository (PDR) may be partitioned into components corresponding to the responsibility structure. Part of 'delegation' is the process of setting up the conditions, requirements, etc. for a subordinate to draft one or more sub-plans for their particular area. The subordinate then submits one or more of these sub-plans based on these conditions and information in the PDR, as well as on their specific experience and other (local) input. On 'submission', this sub-plan is able to be incorporated into higher level sub-plans. During the submission process sub-plans are integrated into a single plan, ensuring overall consistency of the data, and conformance with any constraints defined by users. The process is iterative in nature.

11 Claims, 9 Drawing Sheets

| Organisation Level | User Class |
|---|---|
| Corporate Management | User Class a |
| Corporate Marketing<br>North American Marketing<br>European Marketing | User Class b<br>User Class f<br>User Class g |
| Corporate Sales<br>North American Sales<br>European Sales | User Class c<br>User Class h<br>User Class i |
| Corporate Manufacturing<br>Product A<br>Product B | User Class d<br>User Class j<br>User Class k |
| Research and Development | User Class e |

FIG. 8

| Organisation Level | User Class |
|---|---|
| Corporate Management | User Class a |
| Computing Capital - Corporate<br>Computing Capital - North America<br>Computing Capital - Europe | User Class l<br>User Class n<br>User Class o |
| Computing Expense - Corporate<br>Computing Expense - North America<br>Computing Expense - Europe | User Class m<br>User Class p<br>User Class q |

FIG. 9

COMPUTER-BASED BUSINESS PLANNING PROCESSES

The invention is in the field of databases and data manipulation, or On-Line Analytical Processing (OLAP), particularly in the area of decision support systems (DSS) used for corporate planning and forecasting.

BACKGROUND

In well-run organisations, plans made by senior management are based on information passed to them by subordinates. All levels of the management of an enterprise might have access to a data repository containing information about the history of the business, sometimes known as a data warehouse.

Business planning applications, among them budgeting and forecasting, are increasingly being integrated into an advanced data warehouse solution in order to maximize the payback of the considerable investment in both the computing facilities and the gathering of the data they contain. Data warehousing enables a company to eliminate an extensive amount of workload generated by various reporting tasks. It also facilitates the standardization of data throughout the organization. The company-wide use of such applications results in improved internal communications and more efficient team work.

In dimensional modeling, a data warehouse contains different dimensions and a fact set related to the business structure. Each dimension represents a collection of unique entities that contribute to, and participate in, the fact set independent of entities from another dimension. The fact set also usually contains transactional data where each transaction is identified by a combination of entities, one from each dimension. Within a data warehouse, each dimension is a table where each record contains a key (or a composite key) to uniquely identify each entity and a list of attributes to qualify or describe the corresponding entity (or key). Each fact record in the fact table contains a foreign key to join to each dimension as well as a list of those measures representing the transactional data.

In its usual form such a data warehouse provides the following potential business benefits, among others:
- Assist in identification and understanding of business trends and risks
- Assist in identification and understanding of customer behaviour
- Assist in improvement in the quality of forecasts
- Enabling customer segmentation
- Improvement in customer profitability
- Improving product and service quality
- Enabling smarter marketing and targeting
- Optimizing the use of resources Typically, data warehousing overcomes the conflicts between information requirements and the current operational databases by copying data from the operational or transactional system, often transforming them into a more usable format, and storing them in a separate database optimized for supporting analytical users—so-called Online Analytical Processing (OLAP) and Multi-dimensional OLAP (MOLAP).

Multidimensional navigation and data analysis allow users the freedom to make effective use of the large quantity of data stored in a data warehouse. For example, sales performance may be viewed by company, division, department, salesperson, area, product and customer. Thus, the user can "turn the database cube" to view the information from a variety of desired angles or perspectives, first by department and then by area, for example. A 'drill-down' function allows the user to select a specific area (geographic) of interest and break it down further by product. Further drill-down on a specific product lets the user explore sales by period.

The above is more fully and clearly described in "An Introduction to Database Systems" by C J Date, $7^{th}$ Edition, 2000, Chapter 21 Decision Support, pp 694-729.

The basic idea of OLAP is that users should be able to manipulate enterprise data models across many dimensions to understand changes that are occurring.

Business planning applications, among them budgeting and forecasting, are increasingly being integrated into an advanced data warehouse solution in order to maximize the payback of the considerable investment in both the computing facilities and the gathering of the data they contain. Data warehousing enables a company to eliminate an extensive amount of workload generated by various reporting tasks. It also facilitates the standardization of data throughout the organization. The company-wide use of such applications results in improved internal communications and more efficient team work.

The deployment of wide area networks, in particular the internet and its enterprise-wide equivalents, has resulted in the potential for revolutionary changes in the way enterprises manage their business internally. For example, a primary advantage of a web-based budgeting application is that it permits and encourages high participation throughout an organization. Users can access the application from around the world, at the appropriate level of detail and security, allowing organizations to adapt quickly and to make rapid changes to their goals and strategies. All relevant employees can participate directly in the budgeting process so that plans are developed using information from those who are actually involved in that area of the business. Users simply enter the data relevant to their function, and a calculation engine automatically generates the corresponding financial data after confirming its compatibility with other related data, and integrating it with that other data. This means that upper management can gain a better understanding of the business unit managers' forecasts and the assumptions underlying them.

Upper management is responsible for the strategic goals of the organization and must often explore so-called "what-if" scenarios. The business unit managers, on the other hand, are responsible for reaching these goals through revenue improvement, cost control, and resource allocation. Through web-based budgeting applications, upper management can set goals and priorities in the system to encourage the accomplishment of required objectives. As well, upper management can input standard rates or key planning assumptions such as salary grade levels, product prices, production capacity, inflation rates, and foreign exchange rates to ensure consistency throughout the plan. Business unit managers together with their upper management can, through a series of iterative steps, develop a plan that is aligned with the strategic goals of the organization. Thus a web-based budgeting application bridges the gap between upper management and the business unit management.

Although a number of products address some of the needs for putting together plans for large enterprises, they each have their shortcomings. Examples are "CONTROL"[1] by KCI Computing, Inc. of Torrance, Calif., and "e.Planning"[2] by ADAYTUM of Bloomington, Minn. None of these products have the ability to allow multiple alternate plans to be presented to a superior before selection and rollup into that superior's plan. They are all restricted in their ability to allow roles to have significant complexity in more than one dimension.

[1] TM of KCI Computing, Inc.
[2] TM of ADAYTUM

SUMMARY OF INVENTION

What is needed is a set of improvements in automated planning and budgetary processes so that such processes allow subordinates' plans to be more effectively incorporated into those of their managers.

Definitions

It is helpful to remind the reader of some basic definitions used in the art. The reader is cautioned that in some cases terms are almost synonymous, in others, they have evolved different meanings over time and between different developers.

A cube: A multi-dimensional set of data.

A plan: That which the enterprise uses to assist in determining the decisions for the future—derived from one or more cubes of the planning data repository.

A sub-plan: A portion of a plan or sub-plan within the domain of a responsible manager.

Delegation: 1) The process of assigning sub-plans to subordinate managers and passing sub-plans to those managers. 2) The further process of integrating sub-plans into a single plan, including ensuring overall consistency of the data, and conformance with any constraints defined by users. The meaning is defined by context.

Proposal: A version of a sub-plan capable of being updated (the result of working on a sub-plan).

The invention makes use of a Planning Data Repository (PDR). Although similar to a data warehouse, a PDR differs in that a data warehouse, by definition, contains (only) non-volatile, time-variant, historical data stored in support of management decision-making, whereas a PDR allows changes to be made to virtually any data item. These data are organized and summarized into a multidimensional structure defined by a set of dimensions and measures. Typically, a PDR is generated by making a copy of a data warehouse then adding further fields and schemas related to such items as forecasts and the organizational structure. Thus, in addition to the historical data, a PDR may also contain information related to forecasts and alternative business options/strategies.

A 'sub-plan' which is a subset of the coherent set of data contain in a 'plan', is usually constructed from a data warehouse, or in this case a Planning Data Repository (PDR). In the business decision support system (DSS) environment, plans, in the form of sub-plans (called proposals) of the PDR with data modified by subordinates, are incorporated into higher level proposals (and ultimately the master plan) by their superiors, usually with increasing levels of summarisation, but retaining the necessary precision.

Modelers can only create Dimensions, Cubes, and Datalinks. They can also create and deliver plans from Cubes. Modelers can not create Organizations or Delegations. A Plan Manager can create Delegations and Organizations. A Contributing Manager can only create Delegations.

Subplans are read only objects. Proposals are updatable versions of subplans. Only proposals can be modified, extended, returned, accepted or rejected.

As enterprises grow, it becomes increasingly difficult to assemble comprehensive plans, and at the same time maintain the overall integrity and consistency of the underlying data. In previous systems, higher level plans were based solely on data extracted from subordinate plans, but the direct linkage to the underlying data is then lost. Further, the complexity of the planning process, with its need for close coordination between the users, has previously made it impractical to permit subordinates to contribute more than one version of their plan to the higher levels.

Here, the invention allows several users to manipulate complex data interactively, but separately, and then have the results of their inputs merged. Previous systems did not provide a means to allow a manager to selectively incorporate sub-plans produced by others (subordinates) in an interactive and iterative manner. The invention is based on hierarchical planning which matches typical business environments. The planning process is distributed over the management hierarchy and each level may contribute one or more alternative plans for consideration by a superior level. The distribution of the process is carried out using computer-enabled 'delegation'.

Further the invention allows for the specification of relationships between a dimensional structure and a responsibility structure such that sub-plans and plans using the dimensional structure of the PDR may be partitioned into components corresponding to the responsibility structure. This specification defines an Organisation.

In the invention, part of 'delegation' is the process of setting up the conditions, requirements, etc. for a subordinate to draft one or more sub-plans for their particular area. The subordinate then submits one or more of these sub-plans based on these conditions and information in the PDR, as well as on their specific experience and other (local) input. Such input may include submissions from subordinates obtained through this same delegation process. On 'submission', this sub-plan is able to be incorporated into higher level sub-plans (and ultimately into the master plan) ('accepted') or it might be returned to the subordinate for further work ('rejected') and potentially resubmitted. It is during this submission process that the second part to of 'delegation' takes place—the process of integrating sub-plans into a single plan, including ensuring overall consistency of the data, and conformance with any constraints defined by users. The process is iterative in nature, wherein information and planning data or forecasts, in the form of subordinate sub-plans contributed by others, are selectively incorporated in higher level plans. It is also re-entrant, in that the same process or set of processes may be used for successively higher and lower levels of planning.

It is important to achieve consistency across all of the data in the PDR and this function is carried out by some form of calculation engine. In designing and implementing the calculation engine considerable skill and experience is needed to set up a suitable data model (being the numbers and the relationships between those numbers) which will satisfy the guiding principles of the planning and calculation processes; namely:

Mathematical correctness
Fairness in apportioning changes across several variables
Minimum change to data.
In addition other attributes must be taken into account by the calculation engine and other systems; such as the ability to provide for Cell Locking so that the calculating engine may not change a value in a locked cell.

These principles, combined with a set of prioritised rules for dealing with how functions are applied to cells, or how cells containing altered parameters influence cells containing calculated results where there are 'competing' demands for fairness and correctness because of the complexity of relationships in multi-dimensional data, are important in ensuring the successful application of the invention. The degree of sophistication of these rules, and hence the calculation engine, affect the flexibility of the overall process and the potential complexity of the system which can be modelled, but not the underlying principle.

FIGURES

The invention will be described with reference to the following figures.

DETAILED DESCRIPTION

Figure 1:
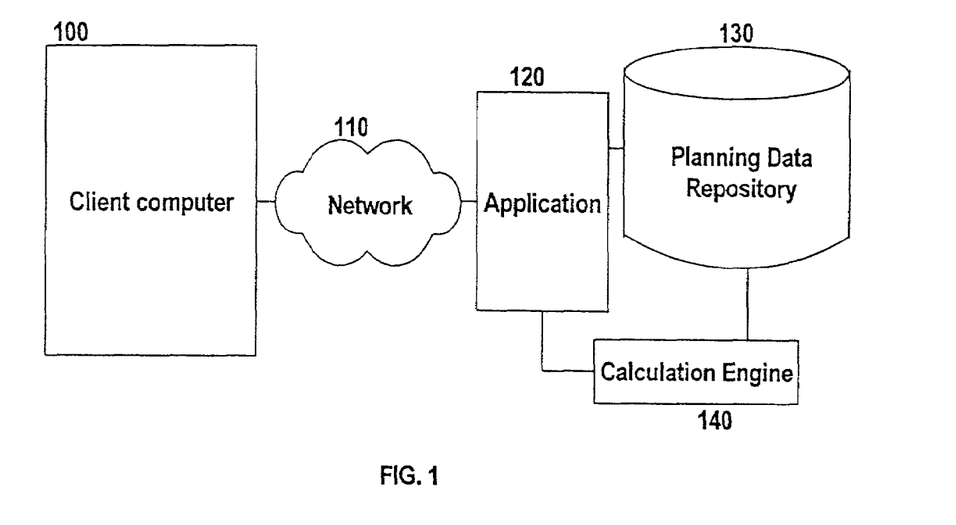
FIG. 1 shows a typical environment within which the invention is practiced.

A typical network environment is shown in the FIG. 1. In this somewhat simplified depiction the planning data repository 130, calculation engine 140, and application 120 are shown in a single location within a Server 105, and a single client computer 100 is depicted, connected to it over a network 110. A full implementation may have the planning data repository 130 residing in one or more locations, with the calculation engine 140 and application 120 within the server 105 performing a coordination role. Of course multiple client computers 100 would also be in use simultaneously, connected over one or more networks 110.

The process covered by the invention is best described in two phases, namely the 'Modeling Phase' and the 'Using Phase'. The Modeling phase is where the data warehouse schema and its relationship to the business as well as the data warehouse are defined. The Using phase is where the various users of the system provide their input and compare scenarios during budget-setting, etc. Each of these phases is now discussed in more detail.

Modeling Phase

In the Modeling phase, the structure of the business or enterprise is considered and defined by an individual or team (the modeler); in other words the relationships between the people managing the enterprise and the data for which they are responsible are recorded.

The following are the Modeling Steps required to implement the invention:

1. Define one or more dimensions (ways of looking at how the company is structured)
2. Create a cube by specifying dimensions from a PDR.
3. Populate the cube manually or from external sources.
4. Define user classes
5. Map user classes to the levels in the structures identified by the dimensions to produce an organisation object.
6. Repeat steps 4 and 5 as required.
7. Create a plan from one or more similar cubes and assign it ownership (user class). Plan creation is the ultimate goal of the modeling phase.

Figure 2:
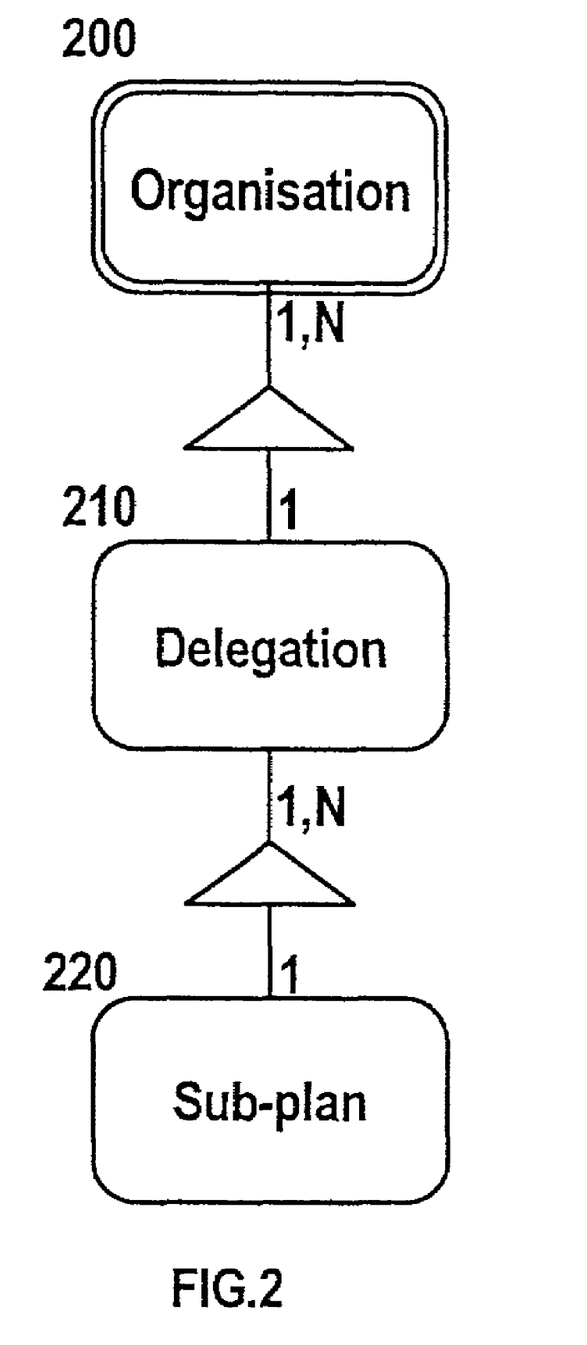
FIG. 2 is shows the relationships between various objects.

Referring now to FIG. 2 which formally describes the relationships between various major elements or objects used in the invention. An Organisation Object 210 (also referred to an 'organisation' or 'view') is defined for the enterprise. An Organisation Object describes how the responsibility for work is allocated. For example, one such Organisation Object might relate the function of each level to product lines, without regard to geographical location, and another to geographical location without regard to product lines. A Delegation object 220 uses an Organisation object 210 and a plan 200. An organisation object can be referred to by multiple Delegations. By applying an Organisation object to a plan, a Delegation can generate one or more subplans 230 both during the initial distribution of the work, and later, during submission processes as Plans or proposals are passed among the various members of the management hierarchy. A Plan or Sub-Plan 200 (which is referred to as a Proposal once submitted to a superior manager) can be referred to by one or more Delegation objects 220.

For each Organisation Object a number of dimensions are considered. These dimensions describe some part of the corporate structure. Further, they define the subset of data contained in the planning data repository (PDR) to be considered during further processing and consideration. It is essential that all of the data required to produce plans for a particular dimension be present in the PDR. A PDR may consist of, or contain, several such plans.

In the invention, a Sub-Plan is passed from the Plan Manager or a Contributing Manager to a reporting (or delegated) Contributing Manager or Contributor by 'delegating' it. In this context, the 'delegation' means 'passing control' of the sub-plan. A Delegation Object is defined which describes how to take a particular Sub-Plan and relate it to the Organisation.

Figure 8:
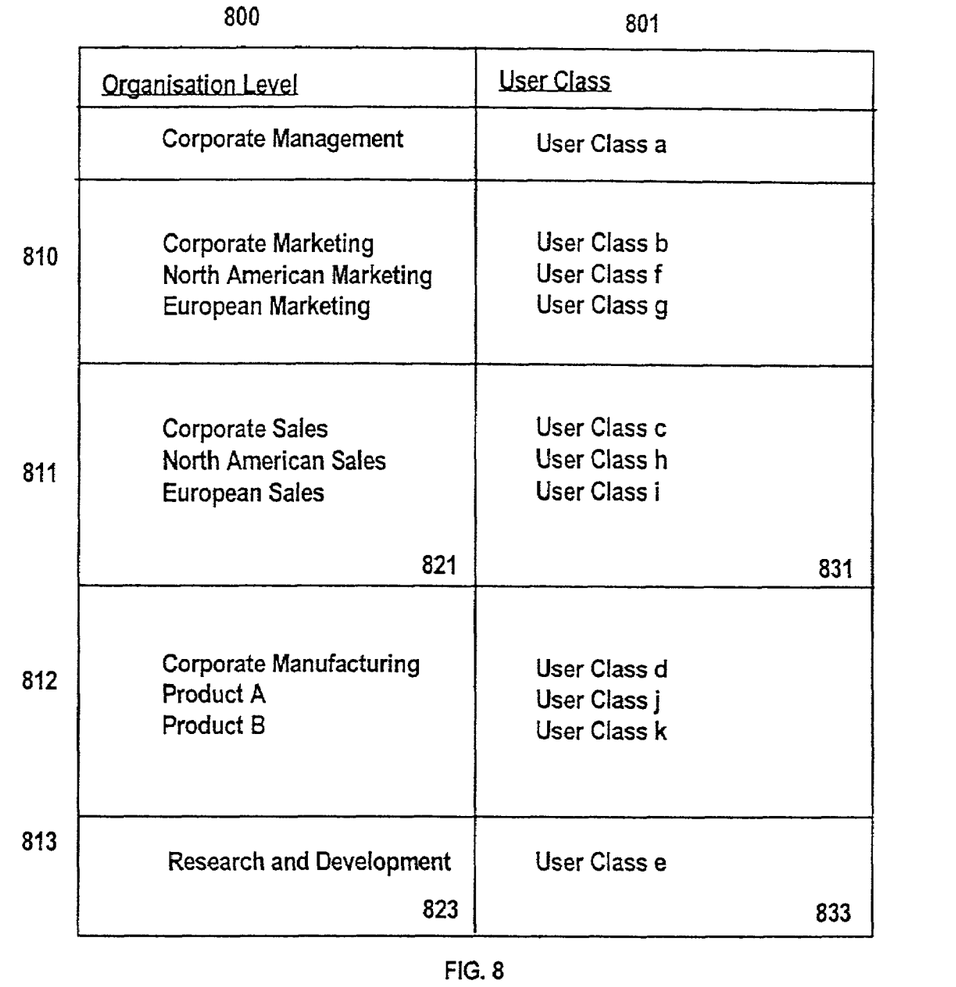
FIGS. 8 and 9 are tables which give two examples of organisations in which the invention may be practiced.
Figure 9:
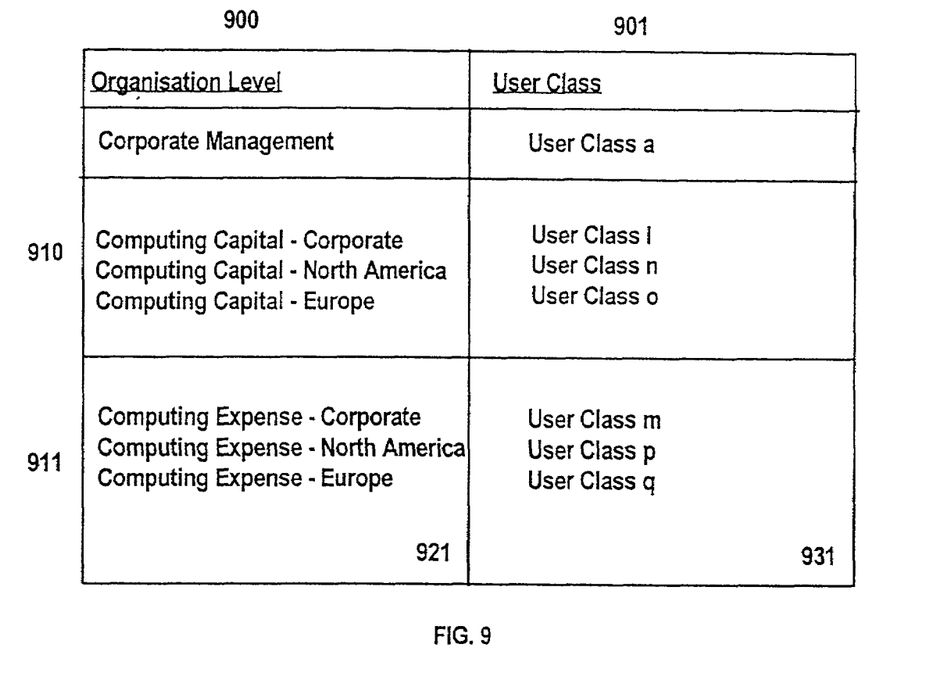

A further function carried out in the modeling phase is the definition of a number of User Classes. These are defined as roles performed by managers, rather than specific individuals. Generally, the levels in a structure defined by a dimension are mapped to one of the User Classes, although not all levels need be mapped, depending on the requirements of the planning process. By this means, a User class defines the role of the person or group and, through one or more Delegation Objects; the one or more sub-plans for which they are responsible FIGS. 8 and 9 are tables which give two examples of Organisation structures relevant to the same enterprise. In the FIG. 8, part of the main management structure is shown. Each Organisation level shown in column 800 may have related User Classes as shown in column 801 by specific User Classes. Each of the rows, 810, 811, 812, 813 relates to a particular function in the corporation. For example, Corporate Sales, North American Sales, and European Sales 821, which are obviously related, use three different User Classes, c, h and i, 831 respectively. In the FIG. 9, other parts of the management structure are shown in relation to part of the main management structure. Each Organisation level shown in column 900 may have related User Classes as shown in column 901 by specific User Classes. Again, each of the rows, 910, 911, relates to a particular function in the corporation. For example, Computing Expense—Corporate, Computing Expense—North America, and Computing Expense—Europe, 921, which are obviously related, use three different User Classes, m, p, and q, 931 respectively.

Thus the table of FIG. 8 relates the various parts of the enterprise involved in manufacture, sales, marketing and research in the various geographic regions, and the table of FIG. 9 relates those parts of the enterprise concerned with computing, both capital and expense, again for the various geographic regions. Although the organisations are somewhat orthogonal, they will have some data in common, since, for example, the marketing divisions of the enterprise will make use of computing resources and must make some provision in their planning process for covering the costs involved. In this case the only common element is Corporate Management—User Class a, which presumably dictates this aspect of the plan. Other examples might have more than one common element (and User Class).

Figure 3:
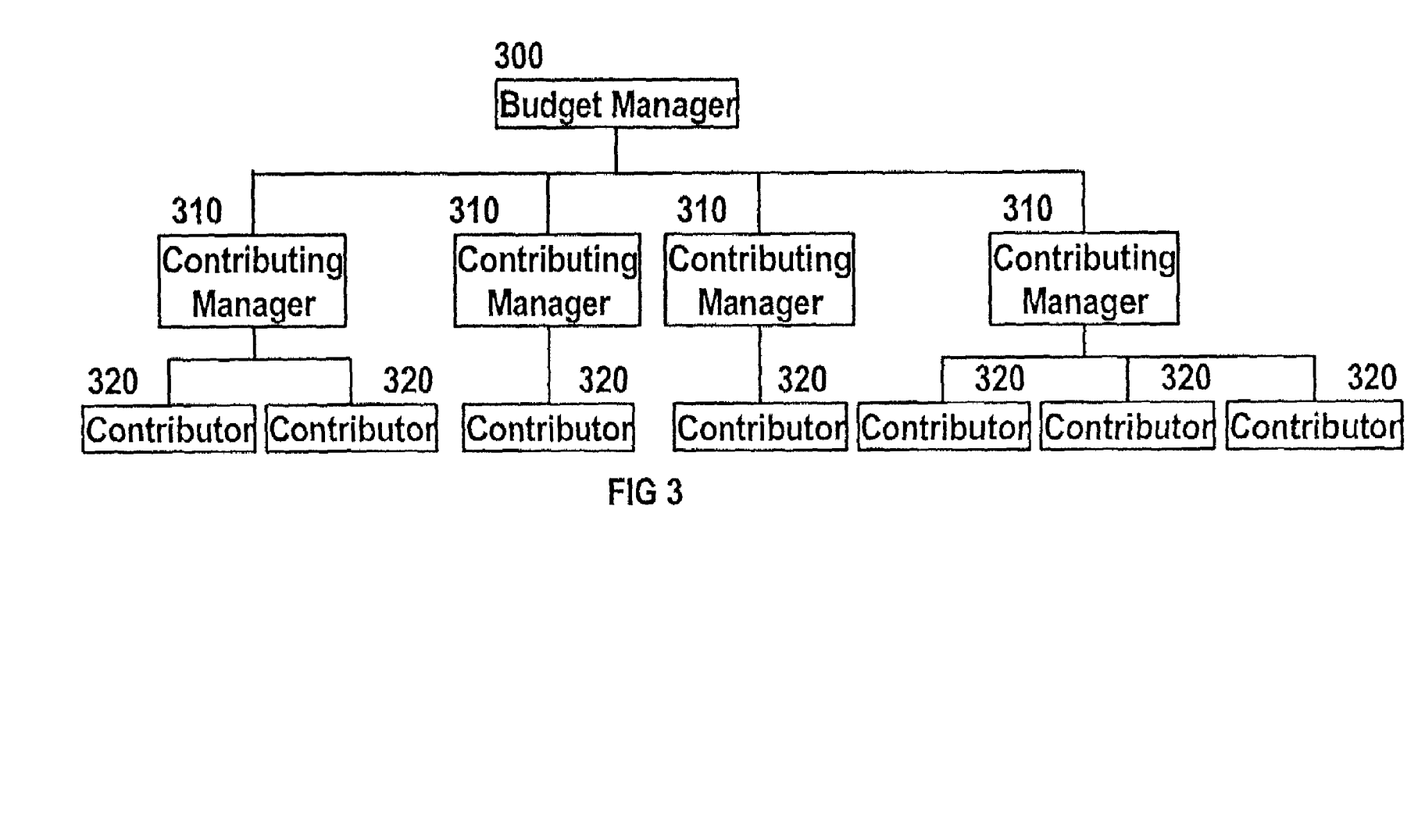
FIG. 3 and FIG. 4 illustrate the hierarchical relationships for reporting structures typical of those used in enterprises.

FIG. 3 shows the relationships between various groups or roles for a simple three level hierarchy. The structures defined or described by a given dimension are strictly hierarchical and generally each level of the hierarchy is a member of one of the following groups:

Plan Manager 300 (PM)

Contributing Manager 310 (CM) (both manages others, and is managed by, and contributes to, someone above—who may be another Contributing Manager 310 or the Plan Manager 300)

Contributor 320 (C) (is managed by, and contributes to, someone above—who will be a Contributing Manager 310, or possibly the Plan Manager 300)

Figure 4:
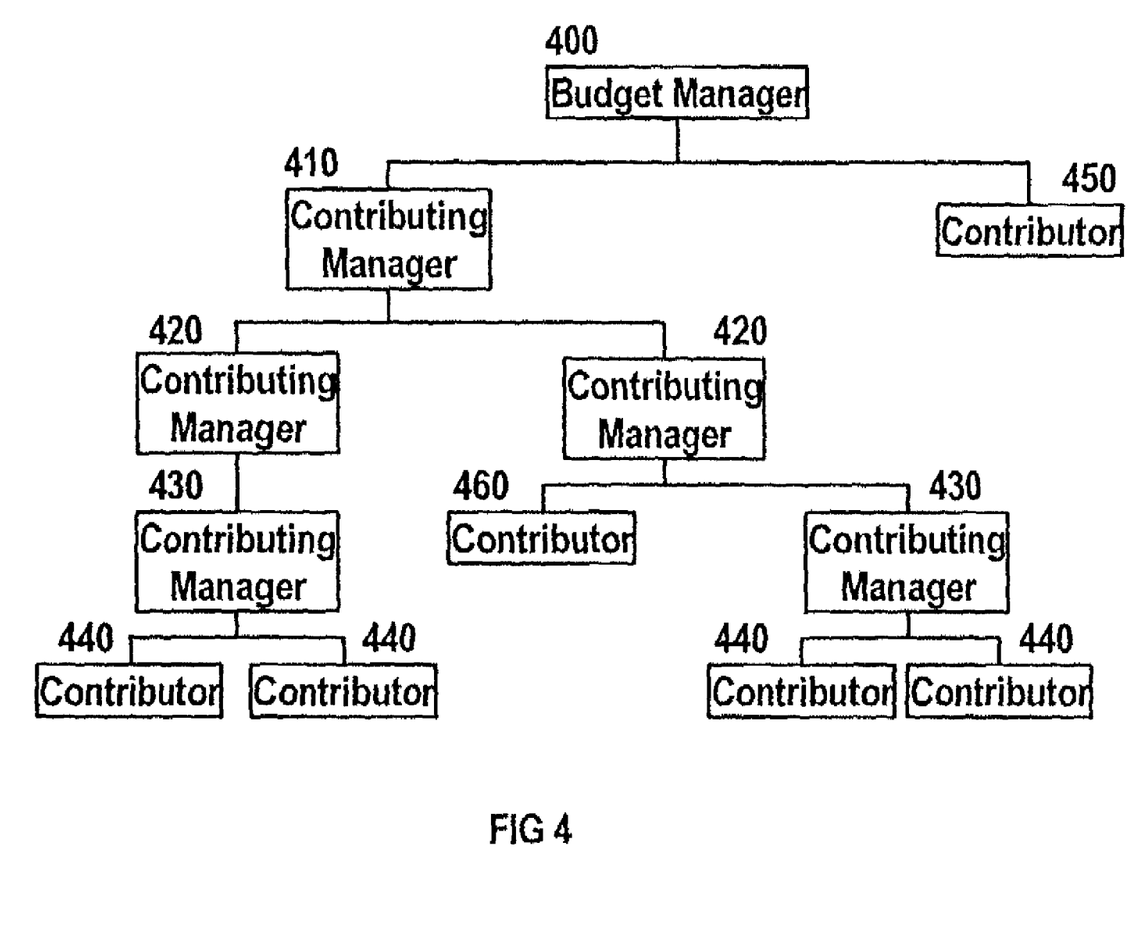

FIG. 4 shows relationships for a more complex hierarchy where some parts of the reporting structure have as many as five levels from the Plan Manager 400 through Contributing Managers 410, 420, 430 to a Contributor 440, and others as few as two where a Contributor 450 reports directly to the Plan Manager 400. Such hierarchies may be arbitrarily deep, and complex, but in all cases there must be a clear reporting structure, such that each Contributor or Contributing Manager reports upwards to only one Contributing Manager or the Plan Manager.

Using Phase

In the 'using' phase, a delegated Contributing Manager (CM) or Contributor is asked to produce one or more sub-plans each of which is within their responsibility. These sub-plans are effectively 'proposals' for the planning process, and the CM or Contributor may choose to pass one, all or some of the proposals to their manager in turn through the 'delegation' process. The manager can then accept or reject any of the proposals in turn. Those that the manager accepts can be incorporated in the sub-plan for which the delegating manager is responsible.

A superior may change the information in a sub-plan before incorporation in their own sub-plan. Their sub-plan, with any changes included, is in turn passed on to their superior manager.

A number of iterations of these steps may take place before a CM or Contributor in turn passes one or more sub-plans to their superior CM or the Plan Manager (PM).

Similarly, the PM can select from alternate sub-plans offered by subordinates by accepting or rejecting them in turn. The PM may then further modify a sub-plan before integrating it into the master plan.

Figure 5:
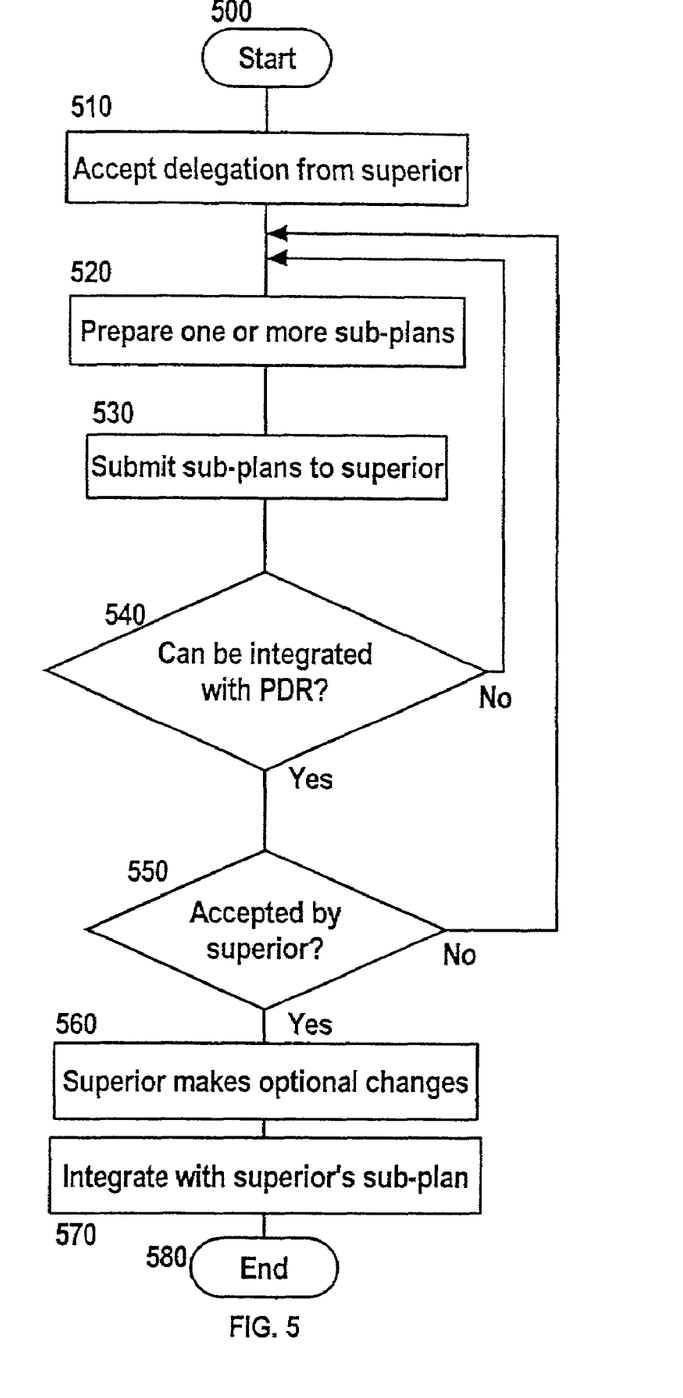
FIG. 5 is a flowchart describing the major steps involved in the 'using phase' of the invention.

A typical sequence of events during the using phase of delegation is now described with reference to the flowchart of FIG. 5. Once the reporting structure (in the form of an Organisation Object) has been added to the planning data repository (PDR), a series of 'delegations begins, starting at the Plan Manager (PM). The delegated Contributing Managers (CM) or Contributors reporting directly to the PM will normally 'Accept' the delegation 510 and prepare one or more sub-plans 520 for the part of the organisation for which they are responsible. The sub-plans are then submitted to the superior CM or the PM 530. At this stage the second part of the delegation process comes into operation in the form of a calculating engine which, under the control of the application software must determine whether the changes made in the sub-plan are compatible with other data in the PDR 540, particularly with overlapping sub-plans. If they are incompatible, the submitting delegated CM or Contributor must prepare alternate plans 520 and resubmit. This cycle will continue until acceptable sub-plans are submitted.

The superior CM or the PM must then decide whether to accept the sub-plan 550. If it is not acceptable, again the submitting delegated CM or Contributor must prepare alternate plans 520 and resubmit. Again, this cycle will continue until sub-plans acceptable to the superior are submitted.

In some cases the superior CM or PM might make some changes 560. Potentially, a similar series of cycles might take place within the system to ensure that the sub-plans as amended by the CM or PM are compatible with other data in the PDR as before and when satisfactory, the sub-plan as submitted and amended is integrated with the superiors plan 570. This ends one iteration for a particular Superior CM and their reporting delegated CM or Contributor.

This sequence might also take place during the preparing one or more sub-plans step 520, as the CM may delegate a subset of the sub-plan to a reporting delegated CM or Contributor. This demonstrates how the sequence is both iterative and re-entrant.

Figure 6:
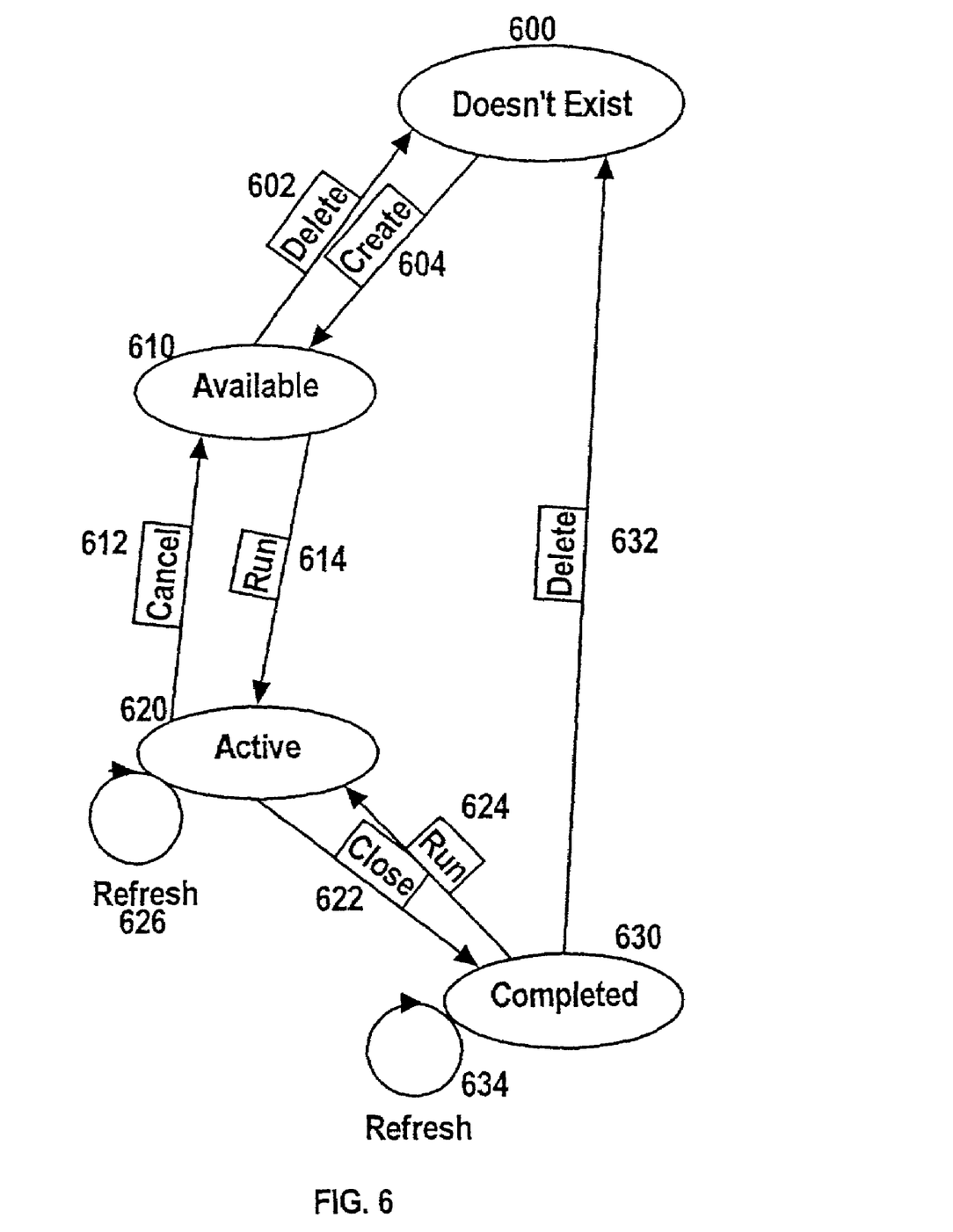
FIGS. 6 and 7 are 'state-transition' diagrams referred to in describing parts of the 'using phase'.

We turn next to FIG. 6, which shows the possible states and transitions for Delegation Objects—their 'life-cycle'. When a Delegation Object is 'Created' 604 it moves from 'Doesn't Exist' 600 to 'Available' 610, when it is 'Run' 614 it moves to 'Active' 620 and finally, when 'Closed' 622 it moves to 'Completed' 630 after which it is 'Deleted' 632 and moves to 'Doesn't Exist' 600. When 'Run' 624 is applied to a 'Completed' 630 delegation, it returns to the 'Active' 620 state. 'Refresh' 626 and 634 updates all sub-plans with current plan data. Users are notified of the change so that they might review the consequences. 'Close' 622 will mark all sub-plans as closed. No proposals can be returned from 'closed' sub-plans, although the action of 'Running' 624 or 'Deleting' it 632 can be used to reactivate a sub-plan, allowing it to be further changed. 'Cancel' 612 is an extreme action used only when the all audit information for a delegation is to be deleted. Optionally, 'Cancel' 612 may cause all delegated sub-plans to be deleted also. Each of the actions (transitions) may optionally cause users to be notified when they take place.

Figure 7:
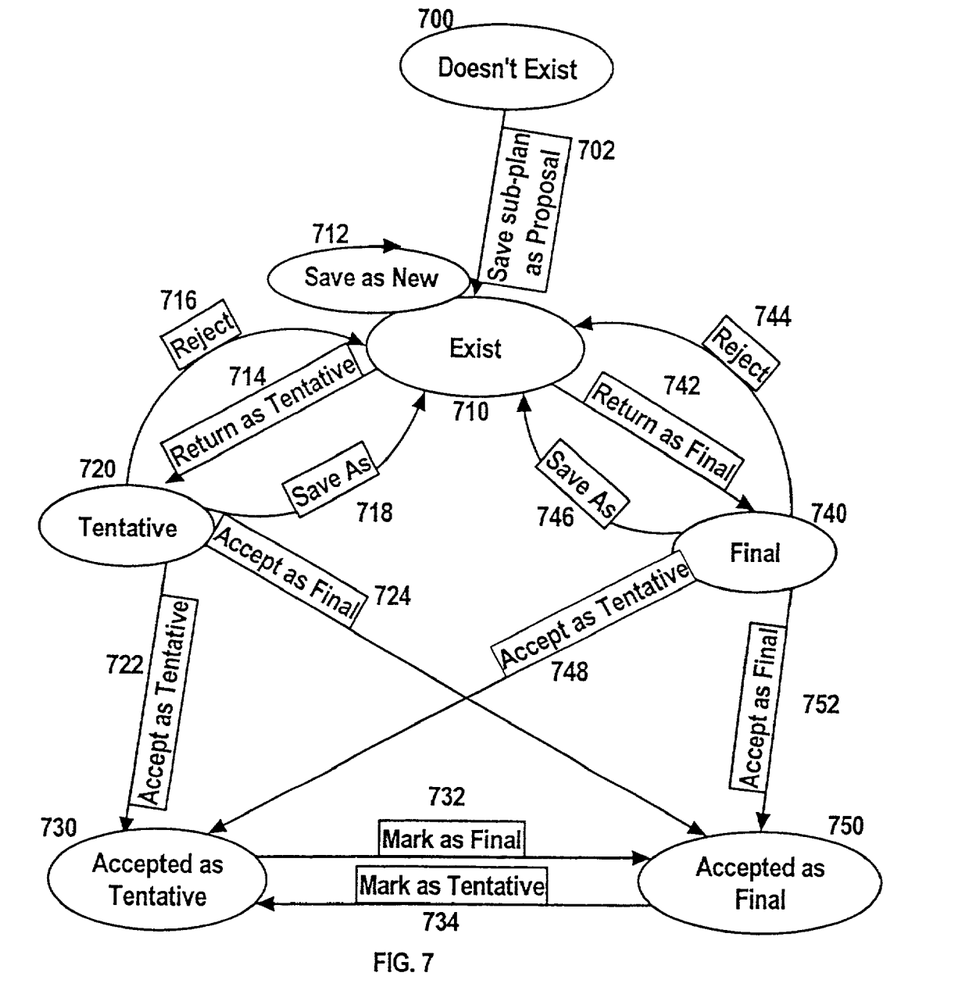

Finally, we turn to FIG. 7 which shows the possible states and transitions for a sub-plan during the using phase. The normal progress is for a sub-plan to be created when it is 'Saved' 702 from 'Doesn't Exist' state 700 to 'Exists' state 710, be 'Returned as tentative 714 (i.e. proposed for adoption) by a delegated Contributing Manager or Contributor as first 'Tentative' 720 then, either once 'Accept as Final' 724 is issued by the superior manager, it is marked 'Accepted as Final' 740, or it may be that the superior manager issues 'Accept as Tentative' 722 first, and moves to 'Accepted as Tentative' 730 then following an 'Mark as Final' 732 it is marked as 'Accepted as Final' 750. However, as is shown, other more circuitous routes to acceptance may also occur. It should be noted that:

A sub-plan can have any number of proposals.

A proposal can be 'extended' to give more detail on particular entries in a given sub-plan.

Any number of proposals can be 'returned as tentative'.

Returned proposals are read only, and the 'extended' detail is suppressed.

Only one proposal can be 'returned as final'. Any existing final proposal gets automatically downgraded.

Once a proposal is 'accepted as final', no further proposals can be returned.

'Reject' will reject all returned proposals for a given sub-plan.

In order to facilitate the maintenance of current data in the various sub-plans, the system includes the following commands in the appropriate contexts:

'Refresh Sub-plans', which updates all dependent sub-plans with current plan data.

'Refresh from Plan', which updates the selected sub-plan with current plan data.

Any changes to figures within a proposal or sub-plan must be subjected to examination to ensure complete consistency across all of the data before being consolidated in the manager's sub-plan. Thus the integration of the planning sub-plans which intersect must also be subjected to similar scrutiny before the integration can be completed. This step may be arbitrarily complex, and may include elements based on experience, as well as a thorough understanding of the construction of the model relating all of the data. The complexity is a function of the underlying calculation engine. If a relatively unsophisticated calculation engine is used, then the step may be somewhat simpler, although the flexibility of the planning process will be limited.

Calculation Engine

The calculation engine used during the delegation process influences the scope of the changes and extent of forecasting that may be accomplished. For best results such a calculating engine should support Back calculation, cell locking during recalculation, as well as the normal mathematical and statistical functions. A co-pending application "A Calculation Engine for use in OLAP environments", Jim Sinclair, Bob Minns, Dave Edmunds, Cognos Incorporated, Attorney/Agent Ref# 08-886651, disclosure of which is incorporated herein by reference, describes a suitable calculation engine. The advantage of the calculation engine described therein lies in the ability to identify, before a step of back-solving and/or forward-solving, the subset of cells that needs to be recalculated. This is done using parent/child tables which simply identify and record the fact that the value in a particular cell depends on a value in one or more other cells. Once such parent/child tables exist, it is much simpler and faster to scan these tables looking for potential dependencies than to look at the actual formulae or functions relating the cells. The result is that there is the potential for huge savings in computing resources required to reach a solution in those situations where the cubes are very large, since in general, the number of cells actually affected by a given set of relationships is much smaller than the number of cells in the cube.

Discussion

It is therefore one object of this invention to pass data from subordinates to their managers in a form which retains the coupling to the underlying data.

A further object of the invention is to make it simple for a subordinate to produce more than one version of their sub-plans allowing their superior to integrate those subplans in turn with higher level plans to assess their respective effect. This permits more active and quicker contribution to the 'what-if' scenario planning processes taking place at higher management levels.

It is a still further object of the invention to provide a formal structure and mechanism to define and 'track' the decision-making responsibility of an organisation.

A yet further object of the invention is to provide a means for a manager to 'drill-down' from higher level plans to examine in more detail the data previously provided by a subordinate, but viewed in the context of the superior manager.

In building a business plan, it is helpful to be able to delegate some aspects of these data sources and derived information to others. The invention allows the overall planner or Plan Manager (PM), to take advantage of the local detailed knowledge of subordinates, both delegated Contributing Managers (CM) and Contributors (C), by delegation of part of the planning process to them, and further provides a convenient means to allow alternative sub-plans to be submitted and selectively incorporated or returned for amendment (and potential resubmission). It is this collaborative aspect that is very powerful.

The invention allows a user to select from a number of alternative sub-plans submitted by subordinates, and optionally incorporate one such selected sub-plan from each subordinate into a higher level sub-plan. Ultimately the master plan produced by the Plan Manager contains data generated by all of the subordinate delegated Contributing Managers and Contributors or the results therefrom.

'Using' Steps

The following summarises the steps typically taken in using the invention by various members of the organisation:

a) For the Plan Manager
1. Receive a plan from the modeler.
2. Define an organisation to assign responsibility to the plan data, by associating user classes to dimensional hierarchies.
3. Define a delegation by associating an organisation to a plan.
4. Optionally delegate sub-plans to subordinate delegated Contributing Managers and Contributors
5. Receive sub-plans from subordinate delegated Contributing Managers and Contributors as proposals.
6. Accept proposals or reject as appropriate. (Proposals may be re-submitted by subordinate).
7. Select no more than one accepted proposal from each subordinate and incorporate into own sub-plan.
8. Alter any forecast figures in own sub-plan (possibly including figures within areas covered by any subordinates sub-plans)
9. Optionally, request subordinate delegated Contributing Managers or Contributors to review changes affecting subordinates sub-plan. (Refresh)
10. Optionally, repeat steps 5-7 creating more possible strategies/plans b) For Each Contributing Manager
1. Receive a (delegated) sub-plan from superior.
2. Optionally delegate sub-plans to subordinate delegated Contributing Managers and Contributors.
3. Receive a proposal from subordinate delegated Contributing Managers and Contributors.
4. Accept proposals or reject as appropriate. (Proposals may be re-submitted by subordinate).
5. Select no more than one accepted proposal from each subordinate and incorporate into own sub-plan.
6. Alter any forecast figures in own sub-plan (possibly including figures within areas covered by any subordinates sub-plans)
7. Optionally, request subordinate delegated Contributing Managers or Contributors to review changes affecting subordinate's sub-plan. (Refresh)
8. Optionally, repeat steps 5-7 creating more possible strategies/plans
9. Forward one or more sub-plans to superior as proposals.
10. Optionally review any suggested changes from superior. (Refresh)

11. Optionally review sub-plans rejected by superior and re-submit if necessary c) For Each Contributor.

1. Receive a (delegated) sub-plan from superior.
2. Alter any forecast figures in own proposal.
3. Optionally, repeat step 2 creating more possible strategies/plans
4. Forward one or more proposals to superior as proposals.
5. Optionally review any suggested changes from superior. (Refresh)
6. Optionally review proposals rejected by superior and re-submit if necessary.

Quick Delegation

In a further embodiment of the invention a quick delegation function is provided so that a PM or CM can forward a plan or sub-plan to a single user class, and have the results returned directly to the forwarding PM or CM, thereby bypassing the use of the organisation object. In all other aspects, the workflow remains the same. This function allows a PM or CM to study a subset of the overall forecast or plan without invoking the full planning delegation process.

Multi-Level Delegation

In a yet further embodiment of the invention the distribution of work is carried out bypassing one or more levels of the management hierarchy so that the overall process may get under way more quickly. In this case a superior manager, knowing which user groups are to be involved, arranges for the sub-plans to be directly made available to those user groups. The corresponding merging, or collation, of the results follows the normal hierarchical process described above so that data collection and selection of appropriate sub-plans are controlled by the responsible managers.

What is claimed is:

1. A computer-based method for the improvement of business planning procedures, including a planning data repository with a fact table, one or more related dimension tables, and relationships for accessing data from the fact table through the related dimension tables, the method comprising:
   a modelling step to create a planning cube and set up relationships between users and data, including the steps of:
   a) defining one or more dimensions describing the structure of an enterprise;
   b) defining one or more user classes;
   c) mapping said user classes to the levels in the structures identified by said one or more dimensions to produce an organisation object;
   d) creating a cube from said planning data repository; and
   e) creating a plan from said cube, thereby assigning ownership;
   and the using step comprises the following steps: a using step to delegate planning and coordinate the passing of data, including the steps of:
   for each contributing manager or contributor as identified by said organisation object:
   f) delegating said plan by a superior manager, who may be a plan manager or contributing manager, to a delegated contributing manager or a contributor;
   g) incorporating changes generated by said delegated contributing manager or said contributor to data within said plan thereby creating a proposal;
   h) passing by said delegated contributing manager or said contributor of said proposal to said superior manager; and
   i) accepting or rejecting by said superior manager of said proposal.

2. The method of claim 1 wherein the planning data repository comprises a number of overlapping and complementary sub-plans of data.

3. The method of claim 1 wherein in the using step, the delegated contributing manager or contributor generate more than one proposal and pass them to a superior manager and said superior manager selects one of said proposals for incorporation in their proposal.

4. The method of claim 1 wherein following the step e) is introduced the step of:
   binding said organisation object to said plan created from a planning data repository, thereby creating a delegation object;
   and the passing step h) incorporates the following step:
   validating said proposal using said delegation object to ensure it is compatible with intersecting sub-plans within said planning data repository.

5. The method of claim 1 wherein within the step i):
   the accepting of said proposal is followed by the step of including said proposal in said superior manager's proposal; and
   the rejecting of said proposal is followed by the step of sending said proposal back to said delegated contributing manager or contributor for further consideration.

6. The method of claim 1 wherein the steps b) and c) are repeated to define more than one organisation object, and following the step e) is introduced the step of binding each of said organisation objects to said plans created from said planning data repository, thereby creating a number of delegation objects.

7. The method of claim 1 wherein the delegating step f) in the using step is replaced by the step of delegating one or more said sub-plans by a superior manager, who, knowing which of at least one user groups are to be involved, arranges for said sub-plans to be directly made available to those user groups and their delegated contributing managers or a contributors, without reference to the directly controlling superior managers of said user groups, thereby causing the distribution of work to be carried out without involving one or more levels of the management hierarchy.

8. A computer-based method for the improvement of business planning procedures, including a planning data repository with a fact table, one or more related dimension tables, and relationships for accessing data from the fact table through the related dimension tables, the method comprising a modeling step and a using step, wherein the modeling step comprises the following steps:
   a) defining one or more dimensions describing the structure of an enterprise;
   b) defining one or more user classes;
   c) mapping said user classes to the levels in the structures identified by said one or more dimensions to produce an organisation object;
   d) creating a cube from said planning data repository;
   e) creating a plan from said cube, thereby assigning ownership; and
   f) binding said organisation object to said plan created from said planning data repository, thereby creating a delegation object;
   and the using step comprises the following steps:
   for each contributing manager or contributor as identified by said organisation object:
   g) delegating said sub-plan by a superior manager, who may be a plan manager or contributing manager, to a delegated contributing manager or contributor;

h) incorporating changes generated by said delegated contributing manager or contributor to data within said plan thereby creating a proposal;

i) passing said proposal to said superior manager using said delegation object to ensure validity of said proposal; and j) accepting or rejecting by said superior manager of said proposal, the accepting of said proposal being followed by the steps of including said proposal in said superior manager's proposal and the rejecting of said proposal being followed by the step of sending said proposal back to said delegated contributing manager or contributor for further consideration.

9. A computer-based system for the improvement of business planning procedures, including a planning data repository with a fact table, one or more related dimension tables, and relationships for accessing data from the fact table through the related dimension tables, the system comprising:

means to model the organisation comprising:

a) means for defining one or more dimensions describing the structure of an enterprise;

b) means for defining one or more user classes;

c) means for mapping said user classes to the levels in the structures identified by said one or more dimensions to produce an organisation object;

d) means for creating a cube from said planning data repository;

e) means for creating a plan from said cube, thereby assigning ownership; and     f) means for binding said organisation object to said plan created from said planning data repository, thereby creating a delegation object;

and means to use the model created by the modeling means comprising:

g) means for delegating said plan by a superior manager, who may be a plan manager or contributing manager, to said delegated contributing manager or contributor;

h) means for incorporating changes generated by said contributing manager or contributor to data within said plan thereby creating a proposal;

i) means for passing said changed proposal to said superior manager using said delegation object to ensure validity of said proposal; and     j) means for accepting or rejecting by said superior manager of said proposal, the means for accepting of said proposal being comprised of means for including said proposal in said superior manager's proposal and the means for rejecting of said proposal comprising means for sending said proposal back to said delegated contributing manager or contributor for further consideration.

10. A computer program product for the improvement of business planning procedures, including a planning data repository with a fact table, one or more related dimension tables, and relationships for accessing data from the fact table through the related dimension tables, the product comprising a computer-readable storage medium having computer-readable program code means embodied in it, said computer readable program code means comprising:

computer readable program code means to model the organisation comprising:

a) computer readable program code means for defining one or more dimensions describing the structure of an enterprise;

b) computer readable program code means for defining one or more user classes;

c) computer readable program code means for mapping said user classes to the levels in the structures identified by said one or more dimensions to produce an organisation object;

d) computer readable program code means for creating a cube from said planning data repository;

e) computer readable program code means for creating a plan from said cube, thereby assigning ownership; and     f) computer readable program code means for binding said organisation object to said plan created from said planning data repository, thereby creating a delegation object;

and computer readable program code means to use the model created by the computer readable program code modeling means, comprising:

g) computer readable program code means for delegating said plan by a superior manager, who may be a plan manager or contributing manager, to said delegated contributing manager or contributor;

h) computer readable program code means for incorporating changes generated by said contributing manager or contributor to data within said plan thereby creating a proposal;

i) computer readable program code means for passing said changed proposal to said superior manager using said delegation object to ensure validity of said proposal; and     j) computer readable program code means for accepting or rejecting by said superior manager of said proposal, the computer readable program code means for accepting of said proposal being comprised of computer readable program code means for including said proposal in said superior manager's proposal and the computer readable program code means for rejecting of said proposal comprising computer readable program code means for sending said proposal back to said delegated contributing manager or contributor for further consideration.

11. An apparatus for the improvement of business planning procedures, comprising a computer having a data storage device coupled thereto, wherein the data storage device stores a relational database and one or more computer programs for the implementation of a relational database and adjunct functions, including a planning data repository with a fact table, one or more related dimension tables, and relationships for accessing data from the fact table through the related dimension tables, said computer and said computer programs comprising;

means for modelling the organization, comprising:

a) means for defining one or more dimensions describing the structure of an enterprise;

b) means for defining one or more user classes;

c) means for mapping said user classes to the levels in the structures identified by said one or more dimensions to produce an organisation object;

d) means for creating a cube from said planning data repository;

e) means for creating a plan from said cube, thereby assigning ownership; and     f) means for binding said organisation object to said plan created from said planning data repository, thereby creating a delegation object;

and means for using the model created by the modeling means, comprising:

g) means for delegating said plan by a superior manager, who may be a plan manager or contributing manager, to a delegated contributing manager or contributor;

h) means for incorporating changes generated by said delegated contributing manager or contributor to data within said plan thereby creating a proposal;
i) means for passing said changed proposal to said superior manager using said delegation object to ensure validity of said proposal; and
j) means for accepting or rejecting by said superior manager of said proposal, the means for accepting of said proposal being comprised of means for including said proposal in said superior manager's proposal and the means for rejecting of said proposal being comprised of means for sending said proposal back to said delegated contributing manager or contributor for more consideration.

* * * * *